(12) United States Patent
Schroeder

(10) Patent No.: US 7,242,706 B2
(45) Date of Patent: Jul. 10, 2007

(54) MEMBRANE SINGLET DELTA OXYGEN GENERATOR AND PROCESS

(75) Inventor: Brady M. Schroeder, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 10/970,099

(22) Filed: Oct. 20, 2004

(65) Prior Publication Data
US 2006/0251572 A1 Nov. 9, 2006

(51) Int. Cl.
*H01S 3/095* (2006.01)
*C01B 13/00* (2006.01)
*C25B 1/30* (2006.01)

(52) U.S. Cl. .................. 372/89; 205/466; 423/579
(58) Field of Classification Search .............. 372/89; 205/466; 423/579
See application file for complete search history.

(56) References Cited

U.S. PATENT DOCUMENTS

| 4,310,502 A | 1/1982 | Wagner |
| 4,342,116 A | 7/1982 | MacKnight et al. |
| 4,461,756 A | 7/1984 | Rockenfeller |
| 4,643,889 A * | 2/1987 | Uchiyama et al. .......... 423/579 |
| 5,229,100 A * | 7/1993 | Harpole ..................... 423/579 |
| 5,246,673 A * | 9/1993 | Hed .......................... 422/224 |
| 5,417,928 A * | 5/1995 | McDermott ................. 422/120 |
| 5,516,502 A | 5/1996 | Dickerson |
| 5,974,072 A * | 10/1999 | Hartlove et al. ............... 372/89 |
| 6,004,449 A * | 12/1999 | Vetrovec ..................... 205/466 |
| 6,072,820 A * | 6/2000 | Dickerson .................... 372/51 |
| 6,154,478 A * | 11/2000 | Vetrovec ..................... 372/89 |
| 6,650,681 B1 * | 11/2003 | Ullman et al. ................ 372/89 |
| 2003/0019757 A1 * | 1/2003 | Vetrovec ..................... 205/466 |

* cited by examiner

*Primary Examiner*—Minsun Oh Harvey
*Assistant Examiner*—Phillip Nguyen
(74) *Attorney, Agent, or Firm*—MacPherson Kwok Chen & Heid LLP; David S. Park

(57) ABSTRACT

A method and apparatus for producing molecular oxygen in the excited singlet delta oxygen electronic state for use as an excited species reactant in a chemical laser. Flowtubes defined by permeable membranes are used to mix the gas and liquid phase reactants to generate singlet delta oxygen and also to separate the generated singlet delta oxygen from the liquid phase products and reactants thereby eliminating liquid reactant carryover.

27 Claims, 3 Drawing Sheets

MEMBRANE SINGLET DELTA OXYGEN GENERATOR AND PROCESS

STATEMENT REGARDING FEDERALLY SPONSORED RESEARCH OR DEVELOPMENT

This invention was made with Government support under 97877(ATL-ATCD) awarded by the United States Special Operations Command. The Government has certain rights in this invention.

TECHNICAL FIELD

The present invention relates generally to generation of singlet delta oxygen and, more particularly, to an apparatus and process for singlet delta oxygen generation for use in laser systems.

BACKGROUND

Lasers are used in several practical applications including but not limited to heating, navigation, and communication. These devices employ an optically active media from which a laser beam is extracted. The beam is generated by means of a population inversion consisting of an unstable abundance of molecules having excited high energy electronic states which release photons as they decay to the equilibrium lower energy states of the optically active media.

In high energy chemical lasers, the excited electronic states are generated by a chemical reaction. For example, one such reaction involves the use of excited molecular oxygen, hereinafter referred to as singlet delta oxygen (SDO) or $O_2(^1\Delta)$, in combination with an optically active media or lasing substance, such as iodine or fluorine. These lasers have been found to be very useful but improved performance characteristics, especially in the area of materials supply and efficiency, is desirable. A number of problems in the generation, storage, and maintenance of the gaseous reactant materials required to produce the necessary population inversion has limited the use of these chemical lasers in military and airborne applications.

One method presently in use for generating a stream of SDO involves a chemical reaction between chlorine gas and a basic solution of hydrogen peroxide, hereinafter referred to as basic hydrogen peroxide (BHP). The excited oxygen can then be added to a suitable lasing medium and the mixture passed through an optical resonator/cavity to bring about a lasing action.

However, several problems are related to previous methods of generating SDO. Residual BHP reactant may flow into the laser nozzle and/or cavity as a contaminant, interfering with the laser gas kinetics and/or optics of the system, thereby reducing overall efficiency of laser power generation. Furthermore, large volumes of hydrogen peroxide, which is an explosive monopropellant and highly corrosive material, are required as production scale increases. Another problem is that the excited oxygen can be reduced to its unusable ground state by metal contact quenching, wall quenching, gas phase quenching, and liquid phase quenching. Therefore, to generate SDO both efficiently and in high yield, the contacting device (reactor or generator) for the gaseous and liquid reactants must provide a large interfacial area in a small volume for a short time, followed by rapid separation of the gaseous and liquid phases.

As a result, there is a need for an enhanced apparatus and method for generating SDO with greater efficiency and safety.

SUMMARY

Apparatus and methods are disclosed herein to generate singlet delta oxygen (SDO) for use in laser systems. For example, in accordance with an embodiment of the present invention, a lattice of membrane channels permeable to gas but not liquid, is provided in the flowpath of BHP with chlorine flowing through the membrane channels. The chlorine reacts with the BHP to generate SDO, and the generated SDO then flows out of the generator through microtubes, thereby eliminating BHP carryover into the nozzle, laser cavity, or other unselected parts of the system.

More specifically, in accordance with one embodiment of the present invention, an SDO generator is provided, comprising a chamber including a liquid inlet for flowing a liquid reactant through the chamber, and at least one membrane flowtube within the chamber for flowing a gas reactant. The membrane flowtube is permeable to the gas reactant thereby allowing a reaction between the gas reactant and the liquid reactant to generate singlet delta oxygen.

In accordance with another embodiment of the present invention, a laser is provided, comprising a singlet delta oxygen generator as described above and a nozzle operably coupled to a reaction product outlet of the generator. A lasing species supply is operably coupled to the nozzle, and a cavity is operably coupled to an outlet of the nozzle for stimulated emission of an electronically excited lasing species.

In accordance with another embodiment of the present invention, a method of generating SDO is provided, including flowing a liquid reactant through a generator, and flowing a gas reactant through a membrane flowtube within the generator, the membrane flowtube being permeable to the gas reactant. The method further includes reacting the gas reactant and the liquid reactant to generate singlet delta oxygen, and flowing the generated singlet delta oxygen through the membrane flowtube to an outlet of the generator.

Advantageously, the present invention eliminates BHP carryover into the laser cavity, eliminates BHP gas entrainment, reduces the volumes of BHP required, allows continuous laser firing, and increases the efficiency in SDO generation and laser power production.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
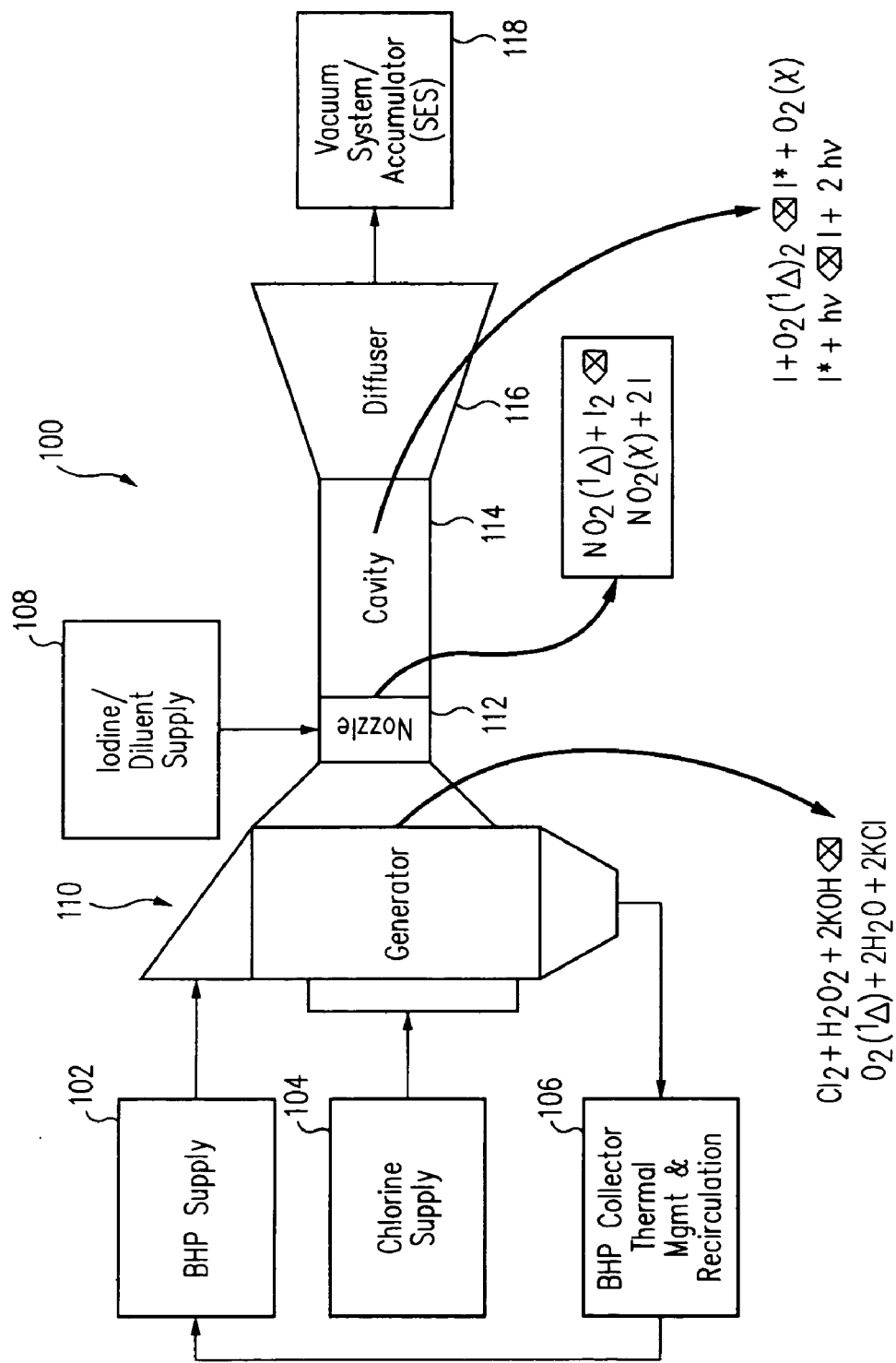
FIG. 1 shows a block diagram illustrating a chemical oxygen-iodine laser (COIL) including an SDO generator in accordance with an embodiment of the present invention.

Embodiments of the present invention and their advantages are best understood by referring to the detailed description that follows. It should be appreciated that like reference numerals are used to identify like or similar elements illustrated in one or more of the figures. Furthermore, the figures may not be drawn to scale.

DETAILED DESCRIPTION

FIG. 1 shows a block diagram illustrating a laser system 100 in accordance with an embodiment of the present invention. In one example, system 100 may be a chemical oxygen-iodine laser (COIL). System 100 includes a singlet delta oxygen (SDO or $O_2(^1\Delta)$) generator 110 operably coupled to a basic hydrogen peroxide (BHP) supply 102 and a chlorine supply 104. A liquid outlet of generator 110 is operably coupled to a BHP collector 106, which collects spent liquid reactants containing dissolved salt, and excess hydrogen peroxide and base (i.e., BHP). In other embodiments, BHP collector 106 may further treat the collected spent liquid reactants and BHP (e.g., heat treatment via a heat exchanger and/or separation via traps) and then recirculate the treated BHP to BHP supply 102 for further use in the generation of SDO.

In one example, BHP supply 102 provides an aqueous mixture of hydrogen peroxide and a base. The base component may be selected from alkaline bases including but not limited to potassium hydroxide (KOH), sodium hydroxide (NaOH), and lithium hydroxide (LiOH), but KOH provides advantages such as low temperature and high concentration. In a further example, BHP can refer to an aqueous mixture of about 70 wt % hydrogen peroxide and about 45 wt % KOH. The BHP is used at low temperature, in one example between about –20° F. and about 0° F.

Chlorine supply 104 provides chlorine gas and, optionally, an inert gas such as argon, nitrogen, or helium, to be injected into the reaction chamber of generator 110 to allow high total pressure operation of the device.

The apparatus and method of the present invention may provide continuous production of SDO by providing a continuous flow of the BHP and chlorine reactants.

With the use of KOH in one example, the BHP and chlorine reactants undergo a reaction in generator 110 to generate SDO following the equation below.

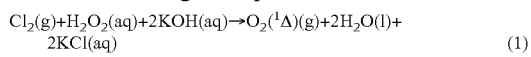
$$Cl_2(g)+H_2O_2(aq)+2KOH(aq)\rightarrow O_2(^1\Delta)(g)+2H_2O(l)+ 2KCl(aq) \qquad (1)$$

Generator 110 produces the SDO energy carrier through a reaction of an aqueous mixture of hydrogen peroxide and potassium hydroxide (in this example the BHP), with gas-phase chlorine. Byproducts of this reaction are a salt (in this case potassium chloride), water, and heat. The potassium hydroxide neutralizes an intermediate product HCl thereby producing potassium chloride and water. The two-phase reaction shown in equation (1) is very exothermic, releasing most of the energy as heat into the BHP solution (110 kJ/mol) and maintaining the rest in an electronically excited state of oxygen called singlet delta oxygen.

Figure 2:
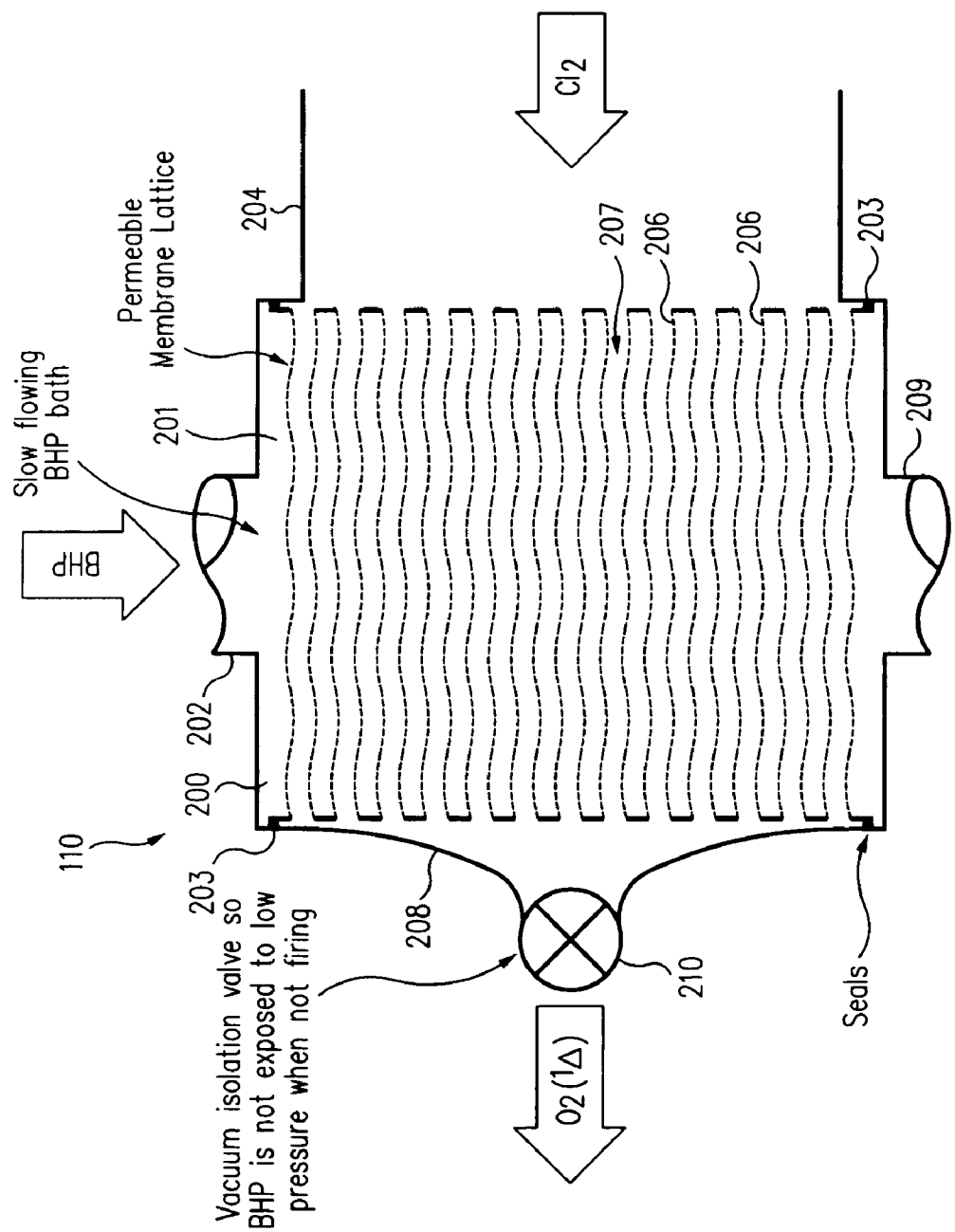
FIG. 2 shows a cross-section diagram of an SDO generator with a membrane lattice forming a plurality of flowtubes in accordance with an embodiment of the present invention.
Figure 3:
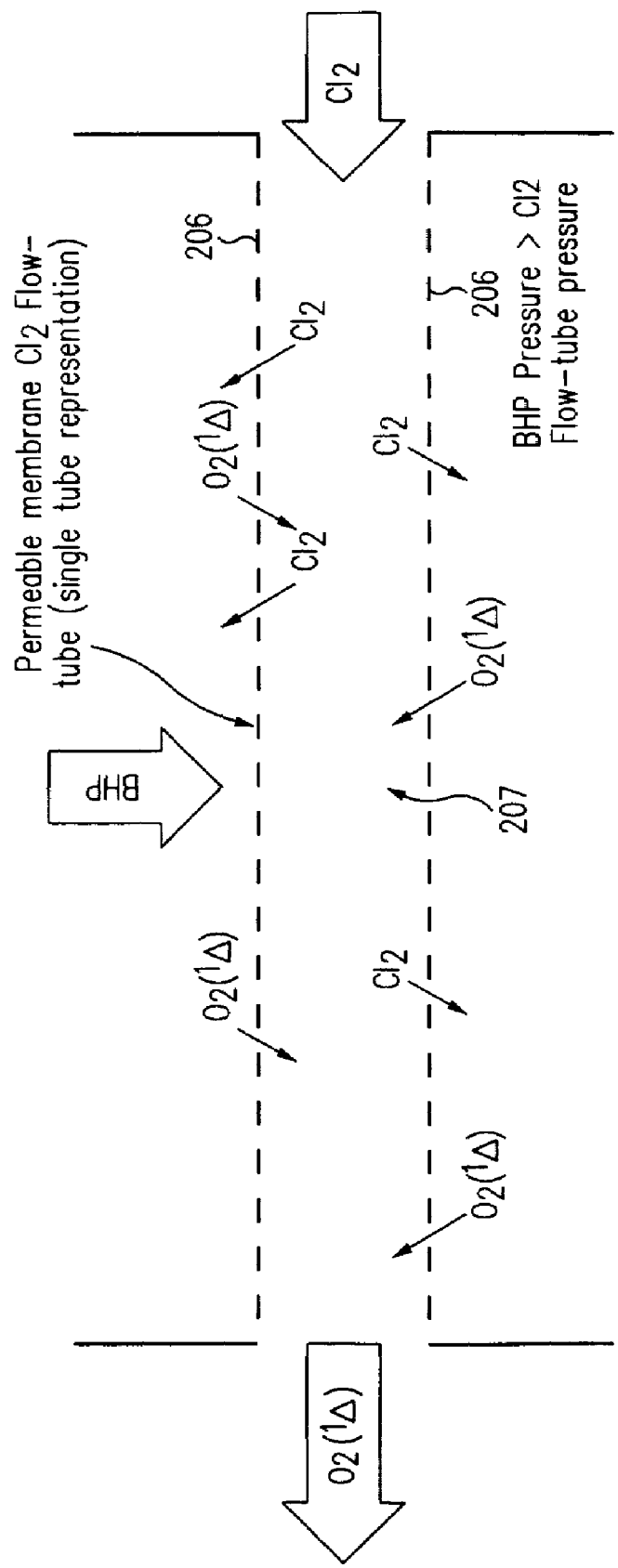
FIG. 3 shows a single flowtube of the SDO generator illustrated in FIG. 2 in accordance with an embodiment of the present invention.

FIG. 2 shows a cross-section diagram of SDO generator 110 comprising a reaction chamber 200 for contacting or mixing the chlorine and BHP reactants. FIG. 3 shows a single flowtube 207 defined by substantially parallel membranes 206 of SDO generator 110 illustrated in FIG. 2.

Referring to FIGS. 2 and 3, a membrane lattice 201 is defined by a plurality of micro-channels or flowtubes 207 within chamber 200. Each of the flowtubes 207 are formed by a membrane 206. Generator 110 further comprises a gas inlet 204 through which the chlorine gas reactant is introduced into flowtubes 207 and accordingly into chamber 200. A liquid inlet 202 introduces the BHP reactant into chamber 200 in a direction substantially perpendicular to the length of flowtubes 207.

In accordance with an embodiment of the present invention, membrane 206 is selectively permeable by phase-type, in one example being permeable to gaseous materials, such as the chlorine reactant and generated SDO, but not being permeable to liquids, such as the BHP reactant and aqueous salt byproducts. Membrane flowtubes 207 thus allow the chlorine flowing therethrough to react with BHP outside the flowtubes while keeping the BHP isolated from the chlorine passageway (i.e., the interior of the flowtube). As a result, the membrane flowtubes are used to mix the gas and liquid phase reactants to generate singlet delta oxygen and also to separate the generated singlet delta oxygen from the liquid phase byproducts and reactants, thereby eliminating liquid reactant carryover.

An example of such a permeable membrane which allows gases but not liquids to pass through the pores of the membrane is available from Liqui-Cel® Membrane Contactors from Membrana of Charlotte, N.C.

In other embodiments, the membranes may be functionalized to be selective for desired ion-type and/or chemical groups. In one embodiment, the membranes may be identical, but need not be necessarily the same. For added flexibility, the membranes may be different membranes and/or include different functional exchange groups with different backbone to allow for control over selective passage through the membrane based upon ion-type, chemical group, and/or phase-type.

Flowtubes 207 are tubular in shape with a circular cross-section in one embodiment, but other geometric cross-sections are within the scope of the present invention.

In accordance with an embodiment of the present invention, the pressure of the BHP flowing outside of flowtube 207 is greater than the pressure of chlorine flowing through flowtube 207. A vacuum valve 210 is provided at the end of a gas outlet 208 so that BHP is not exposed to low pressure when the laser is not firing. As chlorine reactant flows through flowtube 207, the chemical potential gradient "pulls" or "draws" the chlorine through the membrane wall and into the flowing BHP such that the gaseous and liquid reactants mix and a reaction occurs to produce SDO. A pressure gradient based upon the lower pressure within flowtube 207 then draws the SDO generated outside of flowtube 207 (where there is higher pressure) through the membrane wall and into the interior of flowtube 207; i.e., a pressure differential pulls the SDO out of the BHP and into the flowtube. The movement of chlorine and SDO in and out of flowtube 207 is shown by solid-line arrows in FIG. 3. It is noted that any gradient between the interior and exterior of flowtube 207 (e.g., created by electric fields) compatible with the chemical reactants and byproducts may move the chlorine and SDO to generate and separate SDO.

Membrane lattice 201 comprises a plurality of selectively permeable membrane flowtubes 207 spaced apart to provide a large interfacial area in a small volume for the gaseous and liquid reactants to react followed by rapid separation of the liquid and gas phase products. Carryover of the liquid reactant to unselected parts of the system is thereby eliminated and thus, efficiency is improved.

Seals 203 are provided between membrane lattice 201 and chamber 200 proximate reactant inlets 202 and 204 and outlets 208 and 209 such that chlorine reactant enters chamber 200 only through flowtubes 207 and BHP does not contaminant the interior of flowtubes 207. Seals 203 must be able to withstand corrosive effects from the chemical reactants and reaction byproducts.

Referring back to FIG. 1, an outlet of generator 110 is operably coupled to a supersonic nozzle 112, which is also operably coupled to an iodine supply 108. A laser cavity 114 is operably coupled to an outlet of nozzle 112, and a diffuser 116 is operably coupled to an outlet of cavity 114. Finally a sealed exhaust system 118, providing vacuum and accumulation of exhaust gases, is operably coupled to an outlet of diffuser 116.

The excited state of oxygen is stable (approximately 30 minutes lifetime) as a gas at low pressure, which makes the SDO unique. However, the SDO is not capable of acting as a lasing species because of this stability. Thus, molecular iodine is injected into the gas flow of the SDO downstream of generator 110 to facilitate the lasing action. The molecular iodine dissociates into atoms through a series of energy transfer reactions with the SDO. SDO, acting as an energy transfer agent to pump the $^2P_{1/2}$-$^2P_{3/2}$ spin orbit transition of atomic iodine, transfers its energy to the dissociated iodine atoms rapidly, while the energized iodine atoms act as the lasing species. It is noted that various iodine atom generation and injection methods and apparatus may be used within the scope of the present invention.

The gas flow of SDO is accelerated from subsonic to a supersonic velocity by supersonic nozzle 112 to create the laser gain region. Nozzle 112 also lowers the temperature in laser cavity 114 through supersonic expansion as the reaction to create the SDO energy carrier is highly exothermic. Nitrogen is introduced with the iodine as a carrier gas in one embodiment. Energy transfer reactions between molecular iodine and SDO follow the equation below.

$$NO_2(^1\Delta) + I_2 \rightarrow NO_2(\chi) + 2I \quad (2)$$

The stimulated emission reaction from the excited atomic iodine occurs in laser cavity 114 at very low pressure, in one example being as close to vacuum as possible, following the general equations below.

$$I + O_2(^1\Delta) \rightarrow I^* + O_2(\chi) \quad (3)$$

$$I^* + h\nu \rightarrow I + 2h\nu \quad (4)$$

Stimulated emission of the electronically excited atomic iodine results in lasing. The energy transfer process and lasing of the atomic iodine occur several times as the atoms pass through cavity 114.

Diffuser 116 is used for pressure recovery within the system to draw the exhaust from cavity 114 toward sealed exhaust system 118, which is used to treat (e.g., via scrubbing) and remove (e.g., via a dessicant) residual chlorine and iodine.

Advantageously, the SDO generator of the present invention eliminates BHP carryover into the laser cavity thereby reducing contamination. The required BHP volume is also decreased by increasing contact surface area between the flowing chlorine and BHP reactants and decreasing the BHP flowrate, thereby lowering the system weight and footprint. The present invention also reduces entrained gas in the BHP, thus reducing BHP degassing time and hardware and reducing the time between lasing shots. Furthermore, overall efficiency of SDO generation is increased by reducing loss of generated SDO with the BHP outlet in generator 110.

Embodiments described above illustrate but do not limit the invention. It should also be understood that numerous modifications and variations are possible in accordance with the principles of the present invention. For example, in another embodiment, a chlorine trap may be operably coupled to a chamber outlet for separating non-reacted chlorine from the generated singlet delta oxygen. Accordingly, the scope of the invention is defined only by the following claims.

I claim:

1. A singlet delta oxygen generator, comprising:
   a chamber including a liquid inlet for flowing a liquid reactant through the chamber; and
   at least one membrane flowtube immersed in the liquid reactant within the chamber for flowing a gas, the membrane flowtube being permeable to a gas reactant and not to the liquid reactant, thereby allowing a reaction between the gas reactant and the liquid reactant to generate singlet delta oxygen, wherein the generated singlet delta oxygen flows through the membrane flowtube toward an outlet of the chamber.

2. The generator of claim 1, wherein the liquid reactant includes hydrogen peroxide ($H_2O_2$) and a base.

3. The generator of claim 2, wherein the base is selected from the group consisting of potassium hydroxide (KOH), sodium hydroxide (NaOH), and lithium hydroxide (LiOH).

4. The generator of claim 1, wherein the gas reactant includes chlorine.

5. The generator of claim 1, wherein the membrane flowtube flows the gas reactant in a direction substantially perpendicular to the flow of the liquid reactant.

6. The generator of claim 1, wherein the reaction between the liquid reactant and the gas reactant occurs outside of the membrane flowtube.

7. The generator of claim 1, wherein the membrane flowtube is permeable to the generated singlet delta oxygen.

8. The generator of claim 1, wherein the pressure of the liquid reactant in the chamber is greater than the pressure of the gas reactant in the membrane flowtube.

9. The generator of claim 1, further comprising a lattice of membrane flowtubes within the chamber.

10. The generator of claim 1, further comprising a liquid reactant supply and a gas reactant supply, each being operably coupled to the chamber.

11. The generator of claim 1, further comprising a liquid reactant collector, thermal treater, and recycler, operably coupled to an outlet of the chamber.

12. The generator of claim 1, further comprising a chlorine trap operably coupled to a chamber outlet for separating non-reacted chlorine from the generated singlet delta oxygen.

13. A laser, comprising:
   a generator including a liquid inlet for flowing a liquid reactant through the generator;
   at least one membrane flowtube immersed in the liquid reactant within the generator for flowing a gas, the membrane flowtube being permeable to a gas reactant and not to the liquid reactant, thereby allowing a reaction between the gas reactant and the liquid reactant to generate singlet delta oxygen, wherein the generated singlet delta oxygen flows through the membrane flowtube toward a reaction product outlet of the generator;
   a nozzle operably coupled to the reaction product outlet of the generator;
   a lasing species supply operably coupled to the nozzle; and
   a cavity operably coupled to an outlet of the nozzle for stimulated emission of an electronically excited lasing species.

14. The laser of claim 13, wherein the lasing species is selected from the group consisting of iodine ($I_2$) and hydrogen fluoride (HF).

15. The laser of claim 13, further comprising a diffuser operably coupled to an outlet of the cavity.

16. The laser of claim 15, further comprising a vacuum system operably coupled to an outlet of the diffuser.

17. The laser of claim 15, further comprising an accumulator operably coupled to an outlet of the diffuser for isolating residual products including chlorine.

18. A method of generating singlet delta oxygen, the method comprising:
flowing a liquid reactant though a generator;
flowing a gas reactant though a membrane flowtube immersed in the liquid reactant within the generator, the membrane flowtube being permeable to the gas reactant and not to the liquid reactant;
reacting the gas reactant and the liquid reactant to generate singlet delta oxygen; and
flowing the generated singlet delta oxygen through the membrane flowtube to an outlet of the generator.

19. The method of claim 18, wherein the liquid reactant includes hydrogen peroxide ($H_2O_2$) and a base.

20. The method of claim 19, wherein the base is selected from the group consisting of potassium hydroxide (KOH), sodium hydroxide (NaOH), and lithium hydroxide (LiOH).

21. The method of claim 18, wherein the gas reactant includes chlorine.

22. The method of claim 18, wherein the gas reactant flows through the membrane flowtube in a direction substantially perpendicular to the flow of the liquid reactant.

23. The method of claim 18, wherein the membrane flowtube is permeable to the generated singlet delta oxygen.

24. The method of claim 18, wherein the gas reactant and the liquid reactant mix outside of the membrane flowtube to generate singlet delta oxygen.

25. The method of claim 18, wherein the liquid reactant flows through the generator at a greater pressure than the gas reactant through the membrane flowtube.

26. The method of claim 18, further comprising separating the generated singlet delta oxygen from the liquid reactant and byproducts by passing the generated singlet delta oxygen trough a wall of the membrane flowtube.

27. The method of claim 18, further comprising collecting the spent liquid reactant, treating the spent liquid reactant, and recycling the treated liquid reactant back to a liquid reactant supply.

* * * * *